United States Patent
Vinogradov et al.

(10) Patent No.: US 10,943,008 B2
(45) Date of Patent: Mar. 9, 2021

(54) SYSTEM AND METHOD OF DETECTING HIDDEN BEHAVIOR OF A BROWSER EXTENSION

(71) Applicant: AO Kaspersky Lab, Moscow (RU)

(72) Inventors: Dmitry V. Vinogradov, Moscow (RU); Vasily A. Davydov, Moscow (RU); Denis I. Parinov, Moscow (RU)

(73) Assignee: AO Kaspersky Lab, Moscow (RU)

(*) Notice: Subject to any disclaimer, the term of this patent is extended or adjusted under 35 U.S.C. 154(b) by 183 days.

(21) Appl. No.: 16/038,695

(22) Filed: Jul. 18, 2018

(65) Prior Publication Data
US 2019/0243970 A1  Aug. 8, 2019

(30) Foreign Application Priority Data
Feb. 6, 2018  (RU) .......................... RU2018104432

(51) Int. Cl.
*G06F 21/55* (2013.01)
*G06F 21/53* (2013.01)
*G06F 21/56* (2013.01)

(52) U.S. Cl.
CPC .......... *G06F 21/554* (2013.01); *G06F 21/53* (2013.01); *G06F 21/566* (2013.01)

(58) Field of Classification Search
CPC ...... G06F 21/554; G06F 21/566; G06F 21/53; G06F 21/56; G06F 17/00; G06F 3/00
See application file for complete search history.

(56) References Cited

U.S. PATENT DOCUMENTS

| | | | | |
|---|---|---|---|---|
| 7,975,308 B1 * | 7/2011 | Satish | ................ | G06F 21/6263 |
| | | | | 726/26 |
| 8,286,250 B1 * | 10/2012 | Le | ........................ | G06F 21/556 |
| | | | | 726/25 |
| 9,021,468 B1 | 4/2015 | Pizano et al. | | |
| 9,443,077 B1 | 9/2016 | Dingle et al. | | |
| 9,830,453 B1 * | 11/2017 | Feiertag | ................ | G06F 21/562 |
| 2008/0184148 A1 | 7/2008 | Selig | | |
| 2009/0070663 A1 * | 3/2009 | Fan | ........................ | G06F 21/562 |
| | | | | 715/234 |
| 2009/0070869 A1 * | 3/2009 | Fan | ........................ | G06F 21/51 |
| | | | | 726/22 |
| 2011/0145926 A1 * | 6/2011 | Dalcher | ................ | G06F 21/53 |
| | | | | 726/26 |

(Continued)

FOREIGN PATENT DOCUMENTS

RU  2015146875 A  5/2017
WO  2017-083538 A1  5/2017

*Primary Examiner* — Cheng-Feng Huang
(74) *Attorney, Agent, or Firm* — Arent Fox LLP; Michael Fainberg (57) ABSTRACT

The present disclosure is directed towards systems and methods for detecting hidden behavior in browser extensions. In one aspect, a method is provided including launching a browser in a protected environment, performing one or more actions in the browser, tracking events occurring during the performing of the one or more actions, identifying extension events from the events that are initiated by a browser extension, analyzing the extension events for indications of change that correspond to behavior not previously declared by the browser extension, and determining that the browser extension is performing hidden behavior when indications of change are found.

15 Claims, 6 Drawing Sheets

(56) References Cited

U.S. PATENT DOCUMENTS

| | | | |
|---|---|---|---|
| 2011/0185424 A1* | 7/2011 | Sallam | G06F 21/568 726/23 |
| 2012/0291129 A1* | 11/2012 | Shulman | H04L 63/1433 726/23 |
| 2013/0239214 A1* | 9/2013 | Klein | G06F 21/566 726/24 |
| 2014/0250524 A1* | 9/2014 | Meyers | G06F 21/6209 726/22 |
| 2015/0082206 A1* | 3/2015 | Low | G06F 3/0481 715/760 |
| 2017/0163675 A1* | 6/2017 | Warman | H04L 41/50 |
| 2017/0286684 A1* | 10/2017 | Lovelace | G06F 21/57 |
| 2017/0353476 A1* | 12/2017 | Gordon | H04L 63/1416 |

\* cited by examiner

Fig. 1a

Fig. 1b — Extension icons

SYSTEM AND METHOD OF DETECTING HIDDEN BEHAVIOR OF A BROWSER EXTENSION

CROSS-REFERENCE TO RELATED APPLICATIONS

The present application claims the benefit of priority of Russian Patent Application No. 2018104432 filed on Feb. 6, 2018, which is herein incorporated by reference in its entirety.

FIELD OF TECHNOLOGY

The present disclosure generally relates to computer technology designed to protect against computer threats, and more particularly, to systems and methods of analysis of browser extensions to detect hidden behavior in them.

BACKGROUND

The number of software applications installed and used on computing devices, including personal electronic computing devices such as desktop computers and laptops, is constantly increasing. One such application is the web browser which allows users to interact with various communication networks, such as the Internet, in order to view web sites, access computer files of various format, manage web applications, and so forth.

Figure 1A:
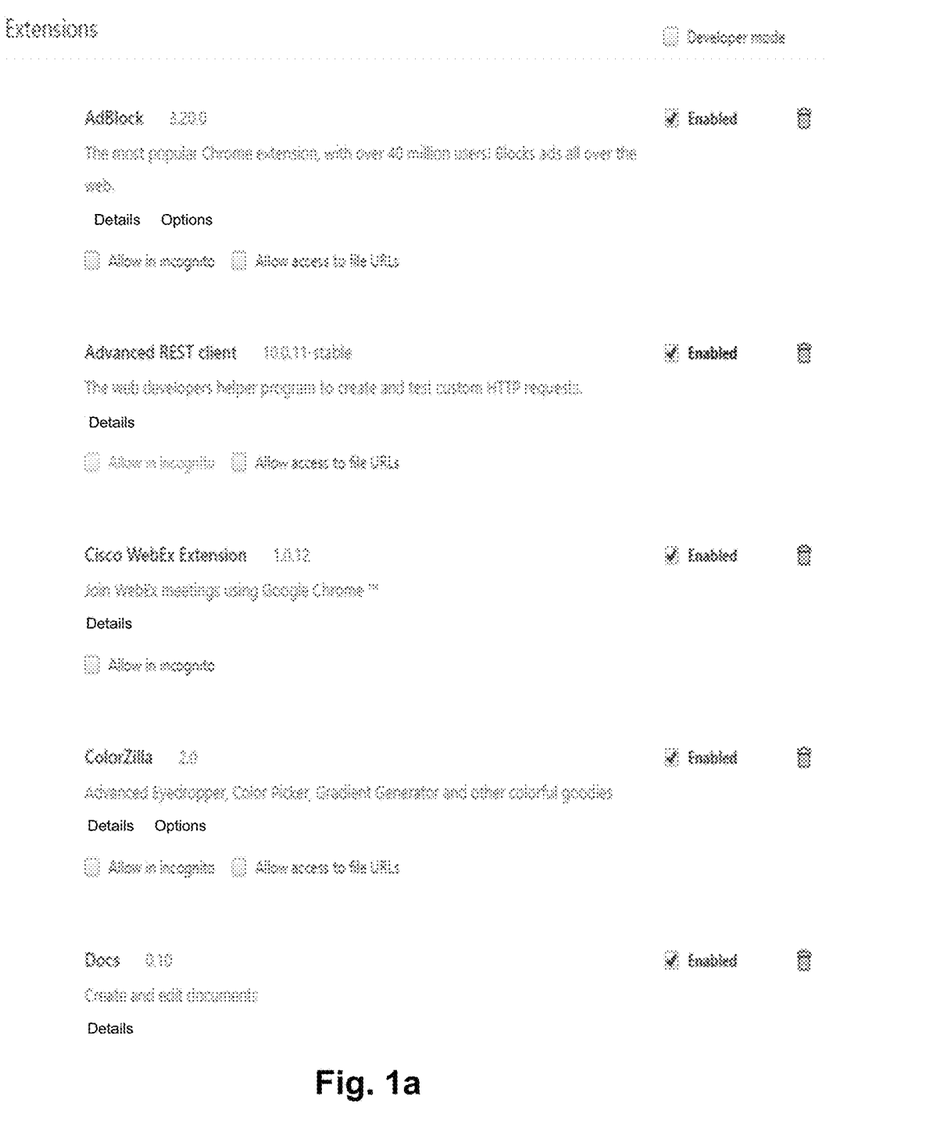
FIG. 1a shows an example of the division of a browser containing installed extensions.
Figure 1B:
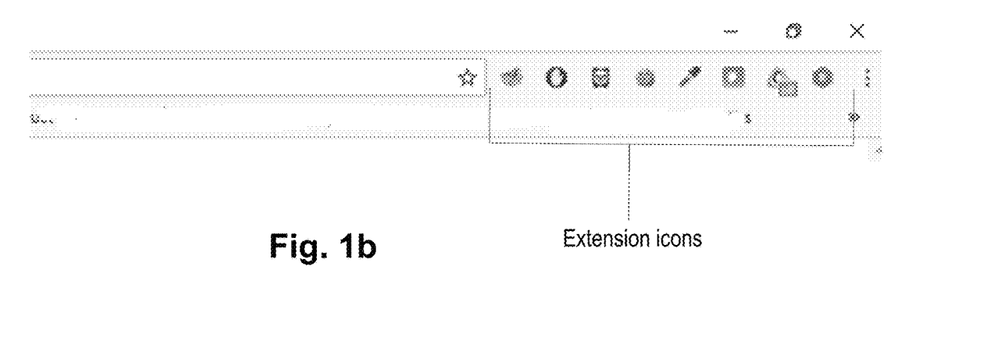
FIG. 1b shows an example of the control panel of a browser containing shortcuts for accessing/launching of the installed extensions.

In order to expand the functional capabilities of the web browser, many web browsers allow extensions, which are modules of software that extends the functionality of the browser by adding functions. Depending on the browser, the term "browser extension" may encompass a plug-in, an add-on, or an extension. Some common browser extensions are shown in FIG. 1A, as well as the extension "Ears Bass Boost", which is an equalizer for each tab in the browsers Google® Chrome® and Yandex® Browser; the extension AdBlocker®, which allows a user to selectively block advertising content; the extension "VK Audio Player", which is a music player; the extension "Mercury® Reader", designed to format pages into a conveniently readable form; and many others. As a rule, each browser extension has an icon on the control panel of the browser for quick starting of the extension as shown in FIG. 1B.

Browser extensions are created and modified both by organizations and by private persons. The extensions of a particular browser are generally available for downloading and installation from official online stores. Alternatively, a user can download a browser extension for installation from other information sources on the Internet.

The widespread use of browser extensions has also given rise to the development of extensions that propagate unwanted content or are developed by hackers for their own gain. Such extensions may engage in unwanted or malicious behavior. For example, they may substitute content in the form of an advertising insertion, gather user data or data related to the user's search queries, steal passwords and user account records, and form a bot net.

In some instances, an extension containing malicious behavior may even be downloaded from an official Internet store such as the Chrome Web Store. One example of this is the "Browse-Secure" extension. The stated purpose of the "Browse-Secure" extension was a guaranteed safe, encrypted and anonymous search. However, after installing the extension, "Browse-Secure" launches a search robot (crawler) and obtains personal data of the user including full name, date of birth, gender, address, telephone and email. Moreover, the extension would assign the user a specific identifier, making it possible to track his actions and extract information about the particular user, and all queries of the user via web search resources would be rerouted to a specially created foreign web site. Accordingly, the stolen data could be used afterwards by the hackers. The described behavior was not declared on the Chrome Store page by the creators of this extension, but instead it was hidden. Hidden behavior of an extension are those activities and actions of extension which are not declared by the creator of the extension.

The difficulty of detecting hidden behavior in browser extensions lies in the fact that browser extensions constitute a set of different files, and in order to determine the overall functionality of the browser extension it is necessary to analyze the entire set of files containing the executable code. Furthermore, the analysis and detection of the full functionality of a browser extension require various functionalities (such as functions, interfaces, and environment variables) provided by the browser, and in certain cases also particular activity of the user, because hidden behavior of an extension is generally manifested only in certain cases or in certain circumstances.

Thus, antivirus technologies such as emulation, static and dynamic analysis of individual components of an extension, in many cases, are unable to determine the full functionality of the extension and consequently will not identify the hidden behavior of the browser extension. Furthermore, the program code of certain executable files of the browser extension might be obfuscated, which also significantly complicates the analysis. Therefore, what is needed is an analysis of the entire set of files of the browser extension all at once, in order to determine the full extent of the extension's operation.

In order to solve the problem of protecting a computing device or the data of users against various hacker actions and malicious programs using browser extensions, a new approach is needed in order to analyze browser extensions and reveal their hidden behavior. The present disclosure enables an effective solution to the problem of detecting hidden behavior of browser extensions, and also to the problem of determining hidden behavior as being malicious behavior of a browser extension.

SUMMARY

The present disclosure makes it possible to investigate the functional capabilities of a browser extension as a whole, as a unified object. In the process of the investigation of the browser extension, hidden behavior or a hidden functionality present in the browser extension being investigated is revealed. In the event of revealing hidden behavior, the present disclosure has the capability of analyzing it and determining it as being malicious behavior.

The technical result of the present disclosure consists in assuring the realization of the purpose, namely, the revealing of hidden behavior in a browser extension. This technical result is achieved by revealing and analyzing the functional capabilities of the extension as a unified object, revealing only those activities which occur as a result of the working of the extension being analyzed.

Another technical result of the present disclosure consists in making it possible to investigate the functional capabilities of a browser extension as a unified object.

Yet another technical result of the present disclosure consists in increasing the likelihood of revealing malicious behavior in a browser extension by revealing hidden behavior in the browser extension.

In one aspect, a method is disclosed for analyzing a browser extension being realized by a computer in order to reveal hidden behavior in the browser extension, wherein the method contains steps in which: the browser extension is installed in a browser which is launched in a protected environment, containing at least an operating system and that browser, comprising a registration module that registers events in the form of another extension; at least one predetermined action is executed, simulating the work of the user, from a data storage; tracking activities occurring during the execution of at least one predetermined action by the registration module, wherein each kind of activity corresponds to defined changes in the protected environment; the events occurring that are related to the changes in the protected environment and initiated solely by the given browser extension are registered in a list of events; the events from the list of events are analyzed for the presence of events indicative of changes which are characteristic of hidden behavior, where the changes characteristic of hidden behavior point to actions of the browser extension not previously declared in the working of the browser extension being analyzed; and the obtained results are saved upon discovering at least one registered event indicative of the presence of hidden behavior in the browser extension being analyzed.

In another aspect, the method additionally involves the revealing of malicious behavior in the browser extension on the basis of the saved results of the analysis.

In yet another aspect, during the detecting of malicious behavior the events occurring as a result of malicious actions are determined among the events indicative of actions being executed as a result of the hidden behavior.

In another aspect, a protected environment refers to one or more of a sandbox, an emulator, and/or any other environment able to monitor the set of resources of the operating system for the execution.

In yet another aspect, the initiators are at least the following: virtual memory, files, register values, network connections, the browser and extensions.

In another aspect, standard actions comprise one or more of opening of one site, performing one or more actions on each opened site, opening the browser settings page and executing search queries in the browser.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

The present disclosure enables an investigation of the functional capabilities of a browser extension as a whole. Thus, in the course of investigating the browser, the combined analysis will enable detection of hidden behavior or a hidden functionality present in the browser extension. Depending on the browser, the term "browser extension" refers to a plug-in, an add-on, or an extension. Hidden behavior refers to activities or actions of a browser extension or portion thereof which are secret, concealed from the users and possibly from antivirus software, and actions that are not declared yet actively executed during the working of the browser extension. Activities also refers to one or more actions taking place in the environment.

An example of hidden behavior is the loading of an executable file from an unknown web resource without knowledge of, or permission from, the user. Since the hidden behavior may reveal a malicious behavior and/or a malicious file corresponding to the behavior, the present disclosure may be part of a system of detecting malicious behavior or malicious files. The detected hidden behavior may be analyzed for the presence of malicious behavior and the system may subsequently pronounce a verdict as to the presence of malicious behavior. In one aspect, an analysis is performed on the basis of rules containing at least one activity. The analysis is subsequently used to pronounce a verdict as to whether the extension is malicious. In one example, the rule may comprise the following series of activities: opening a browser tab with browser settings, loading a foreign script at a particular type of URL, and use of the script "eval" function.

Examples of hidden and unwanted behavior are, without being limited hereto, activities/actions such as:
substitution of present content, such as substitution of part of a web page;
theft of passwords and user account records;
advertising actions in the name of the user;
hidden trafficking in, including creation of, electronic funds (mining of crypto currencies);
gathering of information about the user of a device;
gathering of information about search requests;
concealing of the above-indicated activities or the program code for those activities from the users;
tunneling data through requests and responses
accessing local files on the computer on which the browser is installed
accessing of the registry of the operating system.

The content substitution may be realized by incorporating program code into the browser extension which creates an advertising message or a mechanism for filtering (proxying) of search requests.

The theft of passwords and user account records may be realized by incorporating malicious software in the browser extension of the Trojan-PSW type, which intercepts the corresponding data packets, or by the extension performing the functions of a keylogger.

Advertising actions in the name of the user may refer to, for example, the sending of advertising messages in the name of the user to friends in social networks or malicious software of the Click-Fraud type (a kind of hacking which simulates mouse clicks on an advertisement).

One of the examples of concealing the indicated activities is realized by data substitution mechanisms.

It should be noted that browser extensions, especially for the browsers Google Chrome and Yandex Browser, constitute a set of different files (archives) including elements with JavaScript code and html code. For example, the extension from the Google Chrome Internet store with identifier (id): bmdldbpdnijehkgkiblamnihfjhdhlod, and hash function (md5) of the archive file: 0x58632f0cecd9508a22c26783b878cd02, consists of the following files: background.js, favicon.ico, manifest.json, popup.html, popup.js, popup.js, storing.js, _metadata/computed_hashes.json, _metadata/verified_contents.json. As was mentioned above, the analysis of each file individually cannot determine the functionality of the browser extension so a joint analysis is performed.

Figure 6:
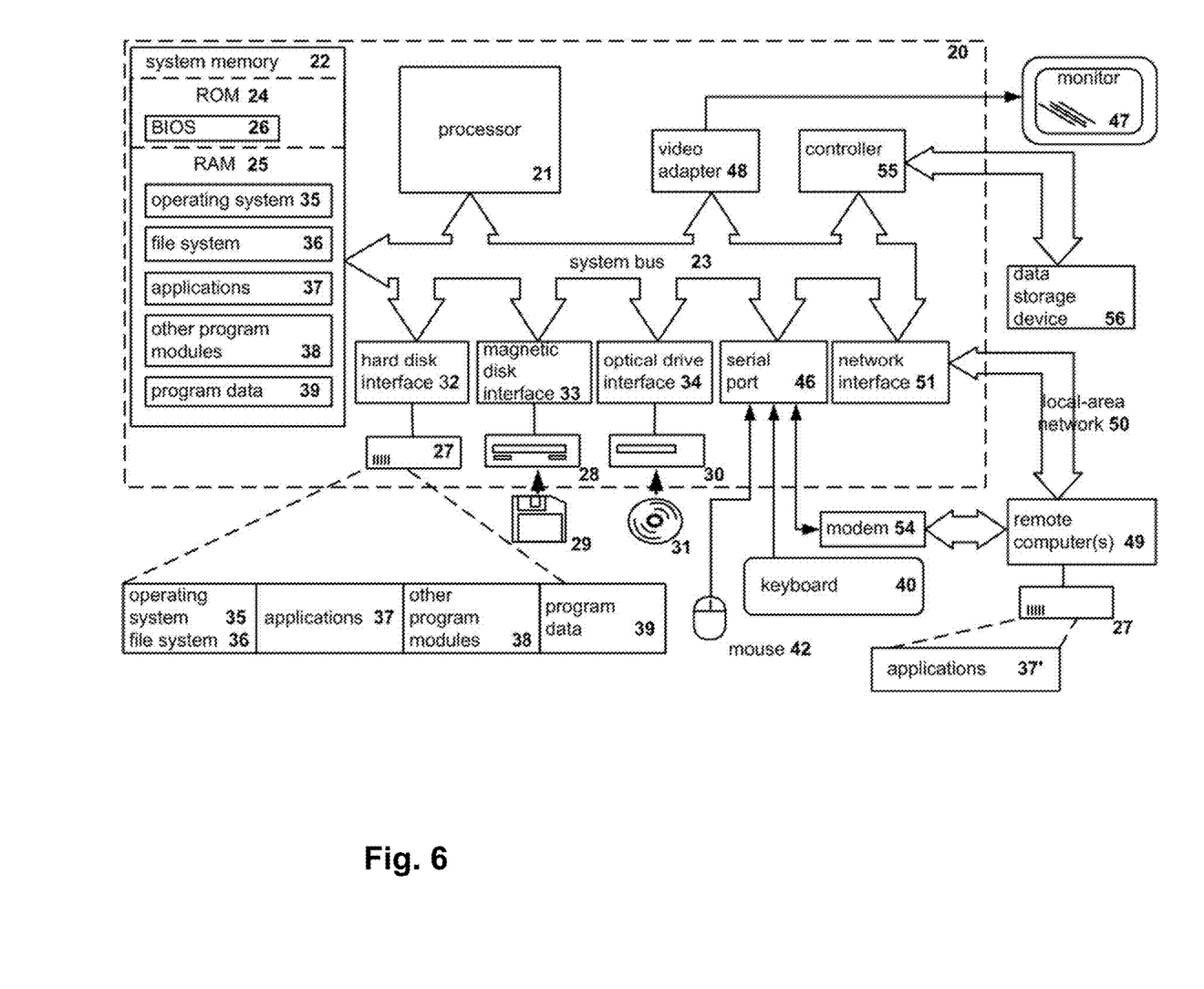
FIG. 6 illustrates an example of a general-purpose computer system on which the present disclosure can be realized according to exemplary aspects of the present disclosure.

The present disclosure may be realized with the aid of a computer system such as computer system 20 shown in FIG. 6. In some aspects, the system 100 performs operations in the framework of a protected environment, wherein the protected environment contains at least an operating system with the web browser. The protected environment makes it possible to limit the working of the browser extension and/or protect the external environment from the browser extension being verified. The external environment in the context of the present disclosure is the environment situated outside the bounds of the protected environment, such as the environment of the system in which the protected environment is installed and running. In one aspect, the protected environment is referred to as "sandbox" technology which is a mechanism of protection incorporated within a virtual machine. In other words, sandbox technology is a segregated and isolated environment in which safe checking of software, including a browser extension, ma be performed. Yet another sample aspect may be a simplified browser version which realizes a minimal set of functionalities to perform the checking of the extension (sending and receiving of web queries, displaying of web pages, authorization and working with the SSL protocol, and so forth).

Figure 2:
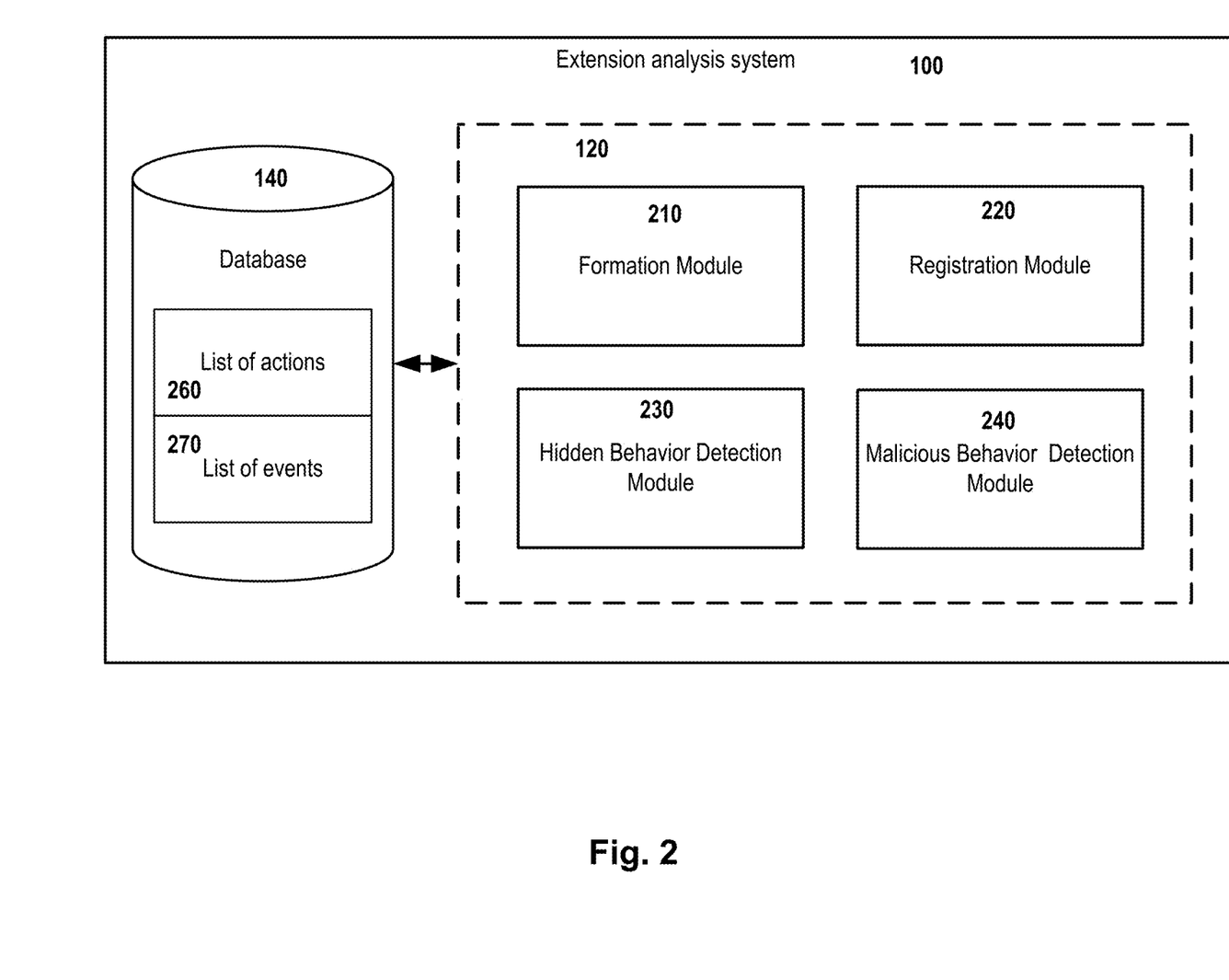
FIG. 2 is a block diagram of a system of analyzing a browser extension to detect hidden behavior with the possibility of determining malicious behavior according to exemplary aspects of the present disclosure.

FIG. 2 shows a block diagram of system 100 of analyzing a browser extension to detect hidden behavior with the possibility of determining malicious behavior (hereinafter, the extension analysis system 100).

The extension analysis system 100 includes a set of modules 120, consisting of at least a formation module 210, a registration module 220, a hidden behavior detection module 230, and a database 140 containing at least a list of actions 260 and a list of events 270. In a particular aspects, the modules 120 also includes a malicious behavior detection module 240. The modules 120 have the ability to perform interactions (exchange data) between themselves and the database 140 in order to implement the behavior of the extension analysis system 100.

According to one aspect, the formation module 210 may form a protected environment in order to prevent, during the analysis of the browser extension, the main operating system (external system) from being compromised, or to prevent leakage of personal data of users of a device. The protected environment may be realized as a number of technologies already indicated above or by other technologies existing at present for the safe analysis of applications, especially browsers. Moreover, the formation module 210 installs the extension intended for analysis in the browser of the protected environment. For this, the formation module 210 may perform either a downloading of the extension from an Internet store containing the necessary extension or an installation of the extension from a particular local storage site. After installation, the formation module 210 selects the set of standard user actions for analyzing the browser extension for hidden behavior, the set containing actions which reproduce (simulate) the actions of the user in the browser. These actions are saved in a list of actions 260. In one aspect, standard user actions are any actions that a user may perform in a web browser installed on acomputer system during the regular course of their use of the browser. Examples of standard user actions in the list of actions 260 are actions such as:
opening of a web site, especially a web site of a particular category;
opening a settings section of the browser;
Internet surfing ("roaming" among sites);
interacting with form components;
submitting forms;
modifying page display characteristics;
and others.

In one aspect, the principle of selecting the user actions is based on an analysis of meta-data about the browser extension, for example, based on an analysis of the functional capabilities declared by the developers of the extension being analyzed according to the particular usage guide.

In yet another particular aspect, a set of standard actions might not be selected. Instead, a predetermined number of actions will be performed by the formation module 210 after installing the extension in the browser. In this case, the indicated set of actions may be the entire list of actions 260 from the database 140. The set of actions may be periodically updated in order to update the actions of the user for the verification.

An example of the list of actions is a set containing the following actions: opening the browser; selecting an email service; checking email; opening additional tabs (for example, settings, a list of extensions, the home page of the browser); going to N sites, where N is a random or predetermined number, in one aspect not greater than 100 (not limited thereto in other aspects); going to a banking site on an online banking page; closing the browser; opening a site from a list, where the list contains at least a social network site, an email service site, and a search service site; performing an entry of data (such as a login and password) for authorization on a site; opening a search service and performing a search by random search queries.

When the set of standard actions (set of actions) has been selected, the formation module 210 performs each action from the set of actions in the entire protected environment, especially in the browser. The actions may be performed either one by one in succession or on the basis of events occurring in the protected environment when performing the action from the indicated set (or when performing a sequence of actions). If the actions are selected based on the events occurring, then in this aspect of the system 100 the formation module 210 contains rules kept in the database 140 for selecting the user action for execution in the protected environment. For example, the rule may contain the following condition: upon detecting a link to jump to a bank site, perform that jump. In another example, the rule contains the conditions: open a social network site and enter or register an account record. It should be noted that, depending on the aspect, the user actions from the set of actions are either all executed in the mandatory order, or until completion of the execution of the browser extension being analyzed, or until detecting hidden behavior in the browser extension being analyzed.

The registration module 220 may analyze activities taking place in the protected environment and register events taking place during the execution of the above-indicated actions. Examples of activities are the execution of a script (a JavaScript script), connecting to a site, modification of pages, for example, involving the appearance of hidden elements on the page and the filling in of data separately from the user, and others. In one aspect, the registration module 220 is another browser extension previously installed in the browser. The registration module 220 has the functional capabilities of a debugger, i.e., a computer program used by program developers to search for and correct errors in other programs, and to track (monitor) the real-time execution of a program. Thus, during the performance of the actions, the registration module 220 tracks the activities taking place in the protected environment, analyzes the tracked activities, and intercepts only those events which were in fact initiated by the extension being analyzed.

The intercepted events are added to the list of events 270, which is created specially for the extension being analyzed. The analysis consists in each kind of activity having corresponding indicated, or defined, changes in the protected environment occurring on account of the execution of those actions. Each change has occurred because of a particular initiator of the activity. Therefore, during the analysis, a determination is made of the changes occurring and the events related only to the browser extension being analyzed. Examples of changes which may occur in the protected environment are at least the changes relating to:
  jumping to different URL addresses,
  downloading a file from a web site,
  accessing or attempting to access local resources,
  changing or attempting to change browser or system settings,
  creating of callbacks to various submit events which occur when sending a form to a server,
  performing of function calls in JavaScript language.

After forming the list of events, the registration module 220 sends this to the hidden behavior detection module 230 for further analysis. According to this aspec, the list of events 270 is kept in the data storage 140.

According to one aspect of the disclosure, the hidden behavior detection module 230 may detect hidden behavior in the browser extension. In one aspect, the hidden behavior detection module 230 analyzes the list of events 270 for the presence of changes which are characteristic of hidden behavior. Changes which are characteristic of hidden behavior are actions of the browser extension which were not previously declared by creators of the browser extension that being analyzed. In this aspect, there was no prior indication, in metadata, textual description or otherwise, that the browser extension would perform particular actions. Upon detecting at least one such action in the browser extension, the hidden behavior detection module 230 determines that the extension is performing hidden behavior and may save the obtained result in the data storage 140. After this, the saved result may be provided to all interested systems or persons, for example, to the malicious behavior detection module 240. The mechanism for notification and presentation of information about the hidden behavior of the extension and the list of events created, other than to the malicious behavior detection module 240, is not disclosed in the present specification in detail, but it should be understood that any of the known mechanisms may be used. The interested sources may be the various databases of antivirus systems for the detecting of such behavior, Internet resource databases, and automatic detection systems.

Figure 3:
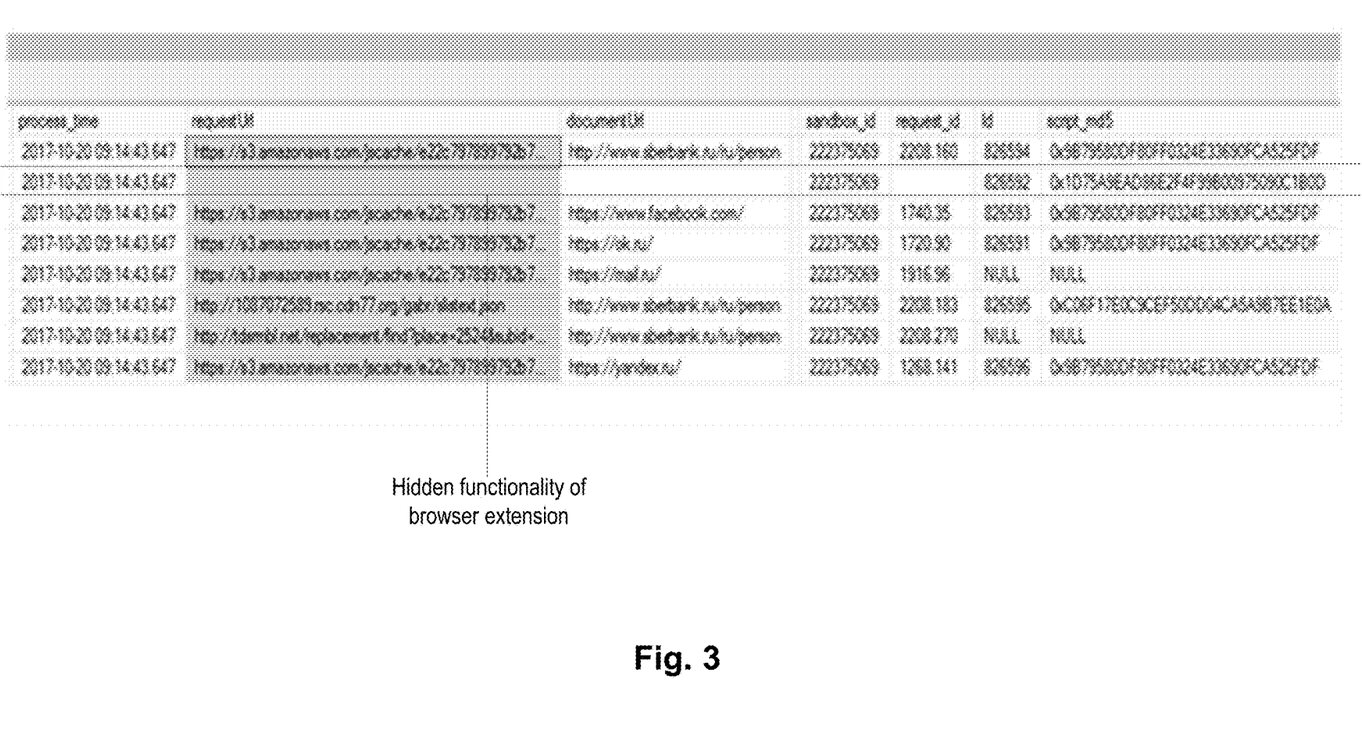
FIG. 3 shows an example of detected files of scripts which were hidden in the original extension according to exemplary aspects of the present disclosure.

An example of an extension in which hidden behavior was identified is the above-given extension with identifier (id): bmdldbpdnijehkgkiblamnihfjhdhlod, and hash function (md5) of the archive: 0x58632f0cecd9508a22c26783b878cd02. FIG. 3 shows a fragment of the list of events occurring due to the activity of this extension while it's the extenstion executes in the browser of a protected environment. In this example, the activity constitutes incorporating advertising scripts into pages of legitimate sites, as well as the presence of hidden behavior as indicated by the md5 of the executed script: 0x1D75A9EAD86E2F4F99B00975090C1BOD.

Another example is the following: during analysis of an extension, an action is performed involving the opening of the website "gmail.com". Subsequently, the extension adds a script to the website "gmail.com". The script then accesses, in the name of "gmail.com", a resource to a specified URL (Uniform Resource Locator). The URL falls, at the time of the analysis, into an advertising link category, which indicates the presence of hidden behavior based on the md5 of the script.

According to one aspect, the malicious behavior detection module 240 may discover malicious behavior. The malicious behavior detection module 240 analyzes the list of events 270 together with the identified script behavior for presence of malicious actions performed. Malicious actions are actions that indicate the infliction of harm on the computer system or personal data of the user. Such infliction of harm includes downloading a malicious file (a Trojan horse) from an external resource, adding a file to the operating system for remote control of the operating system or for gathering information about user actions, theft of personal user data, encryption of data, especially personal user data, for the purpose of extortion, and so forth. In the event of identifying such actions, the malicious behavior detection module 240 pronounces a verdict as to the presence of malicious behavior in the extension and adds the information as to the identified malicious behavior to the corresponding databases, particularly the data storage 140, for subsequent detection and cure or deletion.

The data storage 140 interacts with all modules of the extension analysis system 100 and saves the information required by them on a constant basis, especially the list of actions 260 and the list of events 270.

It should be noted that one feature of the extension analysis system 100 is its ability to distinguish activities relating to the browser extension being verified from activities taking place on account of the running of the actual browser in which the extension is installed, and those of the surrounding/protected environment. The activities taking place are analyzed on the basis of the intercepting of events occurring as a result of a particular activity. In one aspect, activities refer to actions taking place in the surrounding environment. It should be noted that in one aspect, for each kind of activity, a particular set of actions may be formauled, containing the series of operations carried out by software or hardware upon detection of certain actions and the collection of events in the course of the analysis of the extension.

Figure 4:
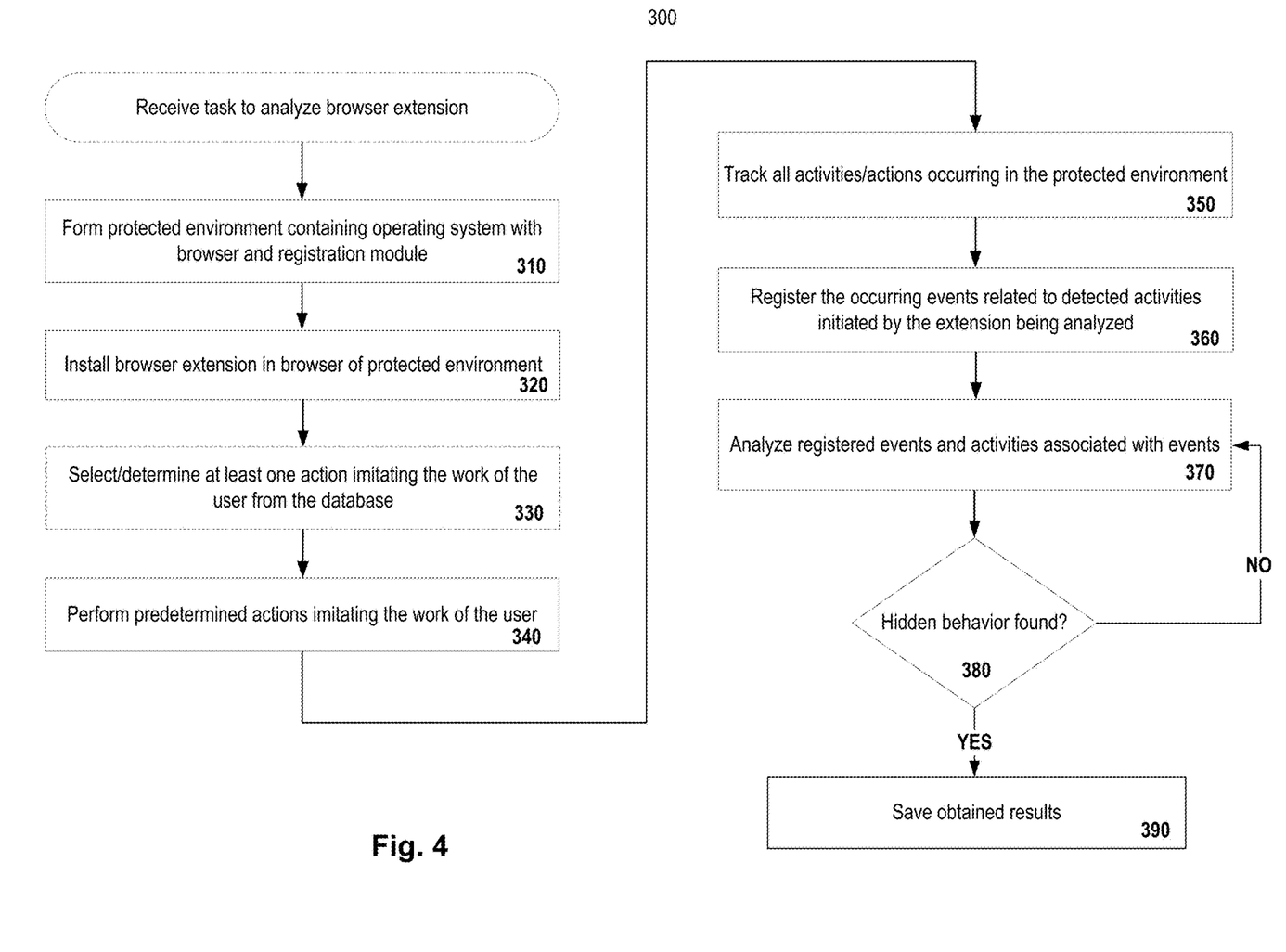
FIG. 4 is a flowchart for the method of analyzing a browser extension to detect hidden behavior in the browser extension according to exemplary aspects of the present disclosure.

FIG. 4 is a flowchart for the method 300 of analyzing a browser extension to detect hidden behavior in the browser extension according to exemplary aspects of the present disclosure.

The method 300 of analyzing a browser extension is realized with the aid of a computer system (e.g. computer system 20) and is an exemplary implementation of components of the system 100, carried out in the framework of a protected environment, the protected environment containing at least an operating system with web browser.

In one aspect, protected environment refers to a technology of the "sandbox" type. In one aspect, "sandbox" technology refers to an analysis of an object (particularly a browser extension) which is based on the analysis of the execution of the object in a limited environment such as an emulator, virtual machine, or the like.

In a particular aspect, the analysis of the browser extension may be done without a protected environment, i.e., on a computer with an installed operating system and browser. In this case, step 310 is omitted, while the browser in which the analysis of the extension is being done contains at least the registration module 220 of the extension analysis system 100.

In yet another particular case, when special working conditions are needed for the checking of the browser extension, different from the customary conditions, then step 310 is performed. In step 310 the formation module 210 forms a protected environment, containing, in one aspect, an operating system and a web browser, while taking into account the special conditions for checking the browser extension. In this aspect, the special conditions are addressed to the performance of a single task, namely, the creating of a maximum realistic protected environment. Examples of special conditions might be a particular list of legitimate extensions and software, the formation of information as to the time of installation of software (i.e., the date of creation of the protected environment), and the specification of a particular location of the software, for example in Russia.

The following instance is an example of the need for such an aspect. A browser extension is being verified and it is assumed that the extension has a malicious functionality, which identifies, or detects, a protected environment (i.e., an anti-sandboxing mechanism is present). For example, the detection is done by checking for seldom used files, from the standpoint of the operating system execution. Such files might therefore be missing from the operating system of the protected environment. In the event of a determination that such a file is missing from the operating system, the malicious functionality might not reveal itself. Special conditions are then needed to form a protected environment in order to create the greatest similarity to the real-world system and to then check the extension. In some aspects, the formation module 210 clones an image of an existing used computer device or system on a regular basis and uses the cloned image as a basis to form the protected environment in order to mimic a real-word environment. Consequently, software, such as a browser extension, is not able to detect or identify a protected environment even using an anti-sandboxing mechanism.

In other aspects, the protected environment is already installed in the computer system from the outset and the method starts with step 320.

In step 320 the formation module 210 is used to install the browser extension needing to be checked in the browser. The installing of the extension in the browser may be done by one of the following methods: the browser extension is downloaded by the formation module 210 from an Internet store, such as the Chrome® store, or another web resource containing the extension for downloading, on the basis of an order received, containing the identifier of the extension, and it is installed in the browser; it is installed on demand of the user on the basis of an order received, containing the path to the installation file of the browser extension. Furthermore, the installation of the browser extension in the browser may also be simulated in the protected environment 210, and the browser "maximally trusts" the indicated Internet store (i.e., no verification is done on the part of the browser for the functionality of the Internet store). Such an option may be needed, for example, when the extension being verified is absent from an Internet store or the protected environment has no real-world access to the Internet. But even in the case of simulating the installation of the browser extension, the possibility exists to control various parameters such as the time of installation, the source of the installation, and so forth.

In step 330 at least one action is determined, imitating the work of the user in the web browser, from the data storage 140. Examples of such actions are the opening of a web site, the opening of the settings page of a web browser, the forming of a search request on a search site, and so forth. The selection of these actions is based at least on an analysis of the meta-data of the extension, which describe the purpose of the extension. Furthermore, the selection mechanism may be optional, and in the event that it is not realized all of the indicated actions from the data storage 140 are used.

In step 340 the formation module performer the determined actions. In a particular aspect, the order of performing the actions may be determined in advance (first case), or performed as dependent on an event occurring for a previous action (second case). In the second case, the list of actions has a tree-like appearance with variant solutions for continuing the performance of the actions and executing the browser extension.

In step 350 during the performing of the predetermined actions for the launched extension, the registration module 220 may track (monitor) all activities and changes occurring in the protected environment.

Next, in step 360, the registration module 220 may register in the list of events only those events which are initiated by the browser extension being analyzed. The registration module 220 may analyze the activity being intercepted and the changes occurring in the protected environment, namely, the actions and events which have occurred as a result of the indicated activities and changes, in order to identify only those events (i.e., initiators) which were initiated by the browser extension being analyzed.

In step 370 the hidden behavior detection module may analyze the events from the list of events for presence of changes that are characteristic of hidden behavior. Changes that are characteristic of hidden behavior refers to those actions of the browser extension which were not previously declared by the browser extension being analyzed. In the event of detecting hidden behavior, the method 300 moves on to step 390. Otherwise, if no hidden behavior is detected, a verdict is pronounced in step 380 as to no hidden behavior in the extension being analyzed and the process is complete.

In step 390 the hidden behavior detection module 230 may save the obtained results, if at least one registered event points to the presence of hidden behavior in the browser extension being analyzed. After this, hidden behavior detection module 230 may provide the saved results to all interested systems or persons, such as the malicious behavior detection module 240.

Figure 5:
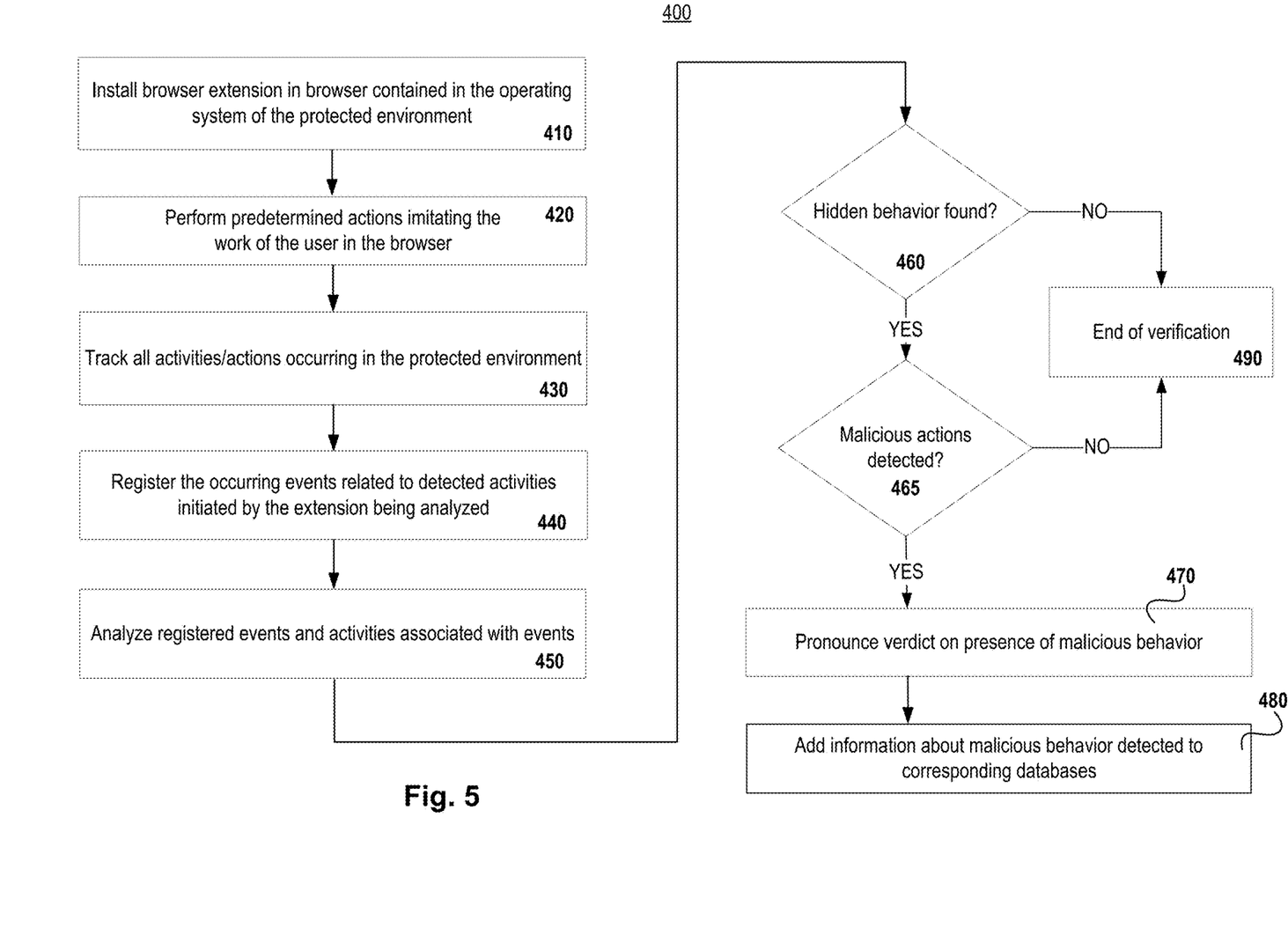
FIG. 5 is a flowchart for a method of detecting hidden behavior of a browser extension with subsequent determination of malicious behavior according to exemplary aspects of the present disclosure.

FIG. 5 is a flowchart for a method 400 of detecting hidden behavior of a browser extension with subsequent determination of malicious behavior according to exemplary aspects of the present disclosure. The method 400 is an exemplary implementation of components of the system 100, such as the formation module 210, the registration module 220, the hidden behavior detection module 230, and the malicious behavior detection module 240.

In step 410 the formation module 210 may install the browser extension in the browser, located in the operating system of a protected environment. As the protected environment, one uses the aforementioned "sandbox" technology. Installation of the extension is done similar to the variants presented in the description of FIG. 2. In step 420 the formation module may perform the predetermined actions, simulating the work of the user in the browser. Determination of the user actions needing to be performed is done similar to step 330 in the description of FIG. 4. In particular, a list of actions is obtained from the data storage 140, the list being up to date for the browser extension under analysis. In step 430 all occurring events associated with the activities taking place in the protected environment as a result of the performance of the aforementioned actions are tracked. Of all the events occurring, in step 440 only the events which have occurred as a result of the activity of the browser extension being analyzed are registered in the list of events. Then, in step 450, an analysis is done for the list of events in order to identify hidden behavior in the browser extension. In the event of identifying at least one hidden behavior in the browser extension, one moves on to step 465. Otherwise, if not a single hidden behavior has been found, analysis of the browser extension is complete.

In step 465 the malicious behavior detection module may analyze the list of events together with the identified hidden behavior for the presence of malicious actions which have occurred. Malicious actions are actions indicative of the causing of harm to the computer system or the personal user data, for example, downloading a malicious file (Trojan horse) retrieved from accessing an external resource, adding of a file to the operating system for remote control of the operating system or for gathering of information on user actions, stealing of personal user data, encryption of personal user data for purposes of extortion, and so on. In the event of identifying such actions, the method 400 proceeds to step 470. Otherwise, if no malicious actions were identified, the method 400 proceeds to step 490, where the verification is complete. In step 470 a verdict is pronounced as to the presence of malicious behavior in the extension. In step 480 information about the detected malicious behavior is added to corresponding databases for subsequent detection and curing or deletion of either the malicious file or the entire extension.

In a particular aspect, in step 470 the malicious behavior detection module 240 may perform a check for the presence of information or methods for curing the identified malicious behavior and in the event of such information being present it is also added to the corresponding databases.

FIG. 6 illustrates a block diagram of an example of a general-purpose computer system (which can be a server) on which the disclosed system and method can be implemented according to an example aspect.

In particular, FIG. 6 can illustrate an exemplary aspect of the sysem 100, such as the, formation module 210, registration module 220, hidden behavior detection module 230 and malicious behavior detection module 230, for example. As shown, a general purpose computing device is provided in the form of a computer system 20 or the like including a processing unit 21, a system memory 22, and a system bus 23 that couples various system components including the system memory to the processing unit 21. It should be appreciated that the processing unit 21 can correspond to CPU 114 and/or CPU 144, and system memory 22 and/or file system 36 can correspond to the electron memory to store data files 112 or memory 148, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMS), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet. It should be appreciated that remote computers 49 can correspond to one or more storage nodes, such as storage nodes 102-107, as described above.

When used in a LAN networking environment, the computer 20 is connected to the local network 51 through a network interface or adapter 53. When used in a WAN networking environment, the computer 20 typically includes a modem 54 or other mechanisms for establishing communications over the wide area network, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other mechanisms of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium excluding transitory, propagating signals. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method to detect hidden behavior of a browser extension, the method comprising:
    launching a browser in a protected environment;
    installing the browser extension in the browser;
    analyzing metadata of the browser extension to determine one or more user actions that activate operation of the browser extension and functions declared to be performed by the browser extension;
    simulating the determined one or more user actions on the browser in the protected environment, wherein the protected environment is configured to register events as a second browser extension;
    in response to the simulating the determined one or more user actions, intercepting events initiated by the browser extension and any resulted changes to the protected environment caused by the events;
    analyzing the events and the resulted changes to identify a hidden behavior of the browser extension that was not previously declared in the analyzed metadata by the browser extension; and
    pronouncing a verdict that the browser extension is engaged in malicious behavior based on the analysis of the events and the resulted changes.

2. The method of claim 1, wherein the resulted changes comprise one or more of accessing or changing: virtual memory, register values, network connections, and the browser.

3. The method of claim 1, wherein the protected environment is one of a sandbox, an emulator, or environment configured to monitor resources on an operating system.

4. The method of claim 1, wherein the one or more actions simulates user actions of a user using the browser.

5. The method of claim 4, the user actions comprising one of opening a site, engaging in activity on the site, opening a settings page of the browser, and executing search queries in the browser.

6. A system to detect hidden behavior of a browser extension comprising:
    a hardware processor configured to:
        launch a browser in a protected environment;
        install the browser extension in the browser;
        analyze metadata of the browser extension to determine one or more user actions that activate operation of the browser extension and to determine functions declared to be performed by the browser extension;
        simulate the determined one or more user actions on the browser in the protected environment, wherein the protected environment is configured to register events as a second browser extension;

in response to the simulating the determined one or more user actions, intercept events initiated by the browser extension and any resulted changes to the protected environment caused by the events;

analyze the events and the resulted changes to identify a hidden behavior of the browser extension that was not previously declared in the analyzed metadata to be performed by the browser extension; and pronounce a verdict that the browser extension is engaged in malicious behavior based on the analysis of the events and the resulted changes.

7. The system of claim 6, wherein the resulted changes comprise one or more of accessing or changing: virtual memory, register values, network connections, and the browser.

8. The system of claim 6, wherein the protected environment is one of a sandbox, an emulator, or environment configured to monitor resources on an operating system.

9. The system of claim 6, wherein the one or more actions simulates user actions of a user using the browser.

10. The system of claim 9, the user actions comprising one of opening a site, engaging in activity on the site, opening a settings page of the browser, and executing search queries in the browser.

11. A non-transitory computer-readable medium storing instructions thereon to detect hidden behavior of a browser extension, the instructions comprising:

launching a browser in a protected environment;
installing the browser extension in the browser;
analyzing metadata of the browser extension to determine one or more user actions that activate operation of the browser extension and to determine functions declared to be performed by the browser extension;

simulating the determined one or more user actions on the browser in the protected environment, wherein the protected environment is configured to register events as a second browser extension;

in response to the simulating the determined one or more user actions, intercepting events initiated by the browser extension and any resulted changes to the protected environment caused by the events;

analyzing the events and the resulted changes to identify a hidden behavior of the browser extension that was not previously declared in the analyzed metadata to be performed by the browser extension; and pronouncing a verdict that the browser extension is engaged in malicious behavior based on the analysis of the events and the resulted changes.

12. The medium of claim 11, wherein the resulted changes comprise one or more of accessing or changing: virtual memory, register values, network connections, and the browser.

13. The medium of claim 11, wherein the protected environment is one of a sandbox, an emulator, or environment configured to monitor resources on an operating system.

14. The medium of claim 11, wherein the one or more actions simulates user actions of a user using the browser.

15. The medium of claim 14, the user actions comprising one of opening a site, engaging in activity on the site, opening a settings page of the browser, and executing search queries in the browser.

* * * * *